United States Patent [19]
Cook et al.

[11] Patent Number: 5,180,051
[45] Date of Patent: Jan. 19, 1993

[54] REMOTE CONTROL CIRCUIT BREAKER

[75] Inventors: Robert G. Cook, Westchester, Ohio; Daniel J. Runyan, Hickman, Nebr.; Willard J. Rezac, Cedar Rapids, Iowa; Thomas A. Edds, Cedar Rapids, Iowa; Ronald J. Bilas, Cedar Rapids, Iowa

[73] Assignee: Square D Company, Palatine, Ill.

[21] Appl. No.: 722,050

[22] Filed: Jun. 28, 1991

[51] Int. Cl.⁵ .................. H01H 5/00; H01H 5/23; H01H 3/40
[52] U.S. Cl. .................. 200/400; 200/292; 200/331; 200/501; 335/14; 335/20; 74/2; 74/89.14; 74/625
[58] Field of Search ........... 200/400, 401, 501, 330, 200/331, 292, 342; 335/14, 20, 68, 69; 74/2, 89.14, 625, 425

[56] References Cited

U.S. PATENT DOCUMENTS

| | | |
|---|---|---|
| 3,594,668 | 7/1971 | Clarke ............... 335/13 |
| 3,808,905 | 5/1974 | Metzinger ............ 74/425 |
| 4,042,896 | 8/1977 | Powell et al. ........ 335/17 |
| 4,619,151 | 10/1986 | Trachman et al. ..... 74/89.14 X |
| 4,623,859 | 11/1986 | Erickson et al. ...... 335/14 |
| 4,877,926 | 10/1989 | Yamase ............. 200/501 X |
| 4,890,184 | 12/1989 | Russell ............. 335/20 X |
| 5,083,103 | 1/1992 | Winter et al. ....... 335/14 |

FOREIGN PATENT DOCUMENTS 291329 11/1988 Japan .................. 200/501

Primary Examiner—Charles E. Phillips
Assistant Examiner—Glenn T. Barrett
Attorney, Agent, or Firm—Kareem M. Irfan

[57] ABSTRACT

A remotely controllable circuit breaker device for interrupting power in a circuit path between a source and a load includes local and remote monitoring capabilities and a worm-gear mechanism for reliable control of the interruption mechanism. The device includes a first contact and a second contact cooperatively arranged in the circuit path so as to provide current from the source to the load. At least one of the contacts are movable for interrupting the power provided to the load. The worm gear mechanism includes a motor with a rotatable shaft which responds to open and closed control signals generated from a remote location, and a gear, rotatably responsive to the rotatable shaft, for controlling the movable contact so that the circuit path is interrupted and established, respectively. The worm gear mechansim controls the movable contact using a coupling arrangement, which has a first part coupled to the movable contact and a second part coupled to the gear.

16 Claims, 7 Drawing Sheets

REMOTE CONTROL CIRCUIT BREAKER

FIELD OF THE INVENTION

The present invention relates generally to remote control circuit breakers and, more particularly, to improvements in the control and monitoring of remotely controlled circuit breakers.

BACKGROUND OF THE INVENTION

Remote control circuit breakers are commonly used for temporary interruption of electrical service during peak use hours and for programmable lighting control of industrial locations. By opening and closing on demand from a remote location, these circuit breakers provide a significant improvement over manually operated circuit breakers in terms of convenience.

One of the more common types of remote control circuit breakers energizes a solenoid to hold the circuit breaker in the open position. Such energization must be continuous to prevent the circuit breaker from moving to the closed position. Unfortunately, continuous energization results in the dissipation of heat which may disturb the calibration of the tripping mechanism of a thermally-responsive circuit breaker and is, therefore, not acceptable for this type of circuit breaker.

The remote control circuit breaker described in U.S. Pat. No. 4,623,859 overcomes these problems by employing a motor to operate the opening or closing of the contacts. The motor is coupled to one of the contacts through a gear, which rotates simultaneously with the shaft of the motor to cause the circuit breaker contacts to open and close.

While the circuit breaker described in U.S. Pat. No. 4,623,859 is more than adequate for many circuit breaker applications, it has the potential of causing wear and tolerance-related problems over time. Moreover, in certain applications there has been a need for a remotely controlled circuit breaker which is easier and more convenient to monitor and operate locally as well as remotely.

SUMMARY OF THE INVENTION

It is a general object of the present invention to provide an improved remote control circuit breaker arrangement which overcomes the aforementioned deficiencies of the prior art and which is more convenient to monitor and operate locally and remotely.

It is a more specific object of the present invention to provide an improved remote control circuit breaker arrangement which substantially eliminates wear and tolerance problems associated with the prior art.

It is another object of this invention to provide an improved circuit breaker arrangement having reliable, yet inexpensive, local and remote signals for indicating whether power to the load has been interrupted, thereby eliminating the need for moving parts to monitor the load.

It is another object of this invention to provide an improved circuit breaker arrangement which includes an override mechanism which can control the circuit breaker arrangement in the event that the operator desires to disable the remote control portion of the arrangement.

In accordance with the present invention, the foregoing objectives are realized by providing a remotely controllable circuit breaker device for interrupting power in a circuit path between a source and a load. The device includes: a first contact and a second contact cooperatively arranged in the circuit path so as to provide current from the source to the load and at least one of the contacts being movable for interrupting the power provided to the load: gear driving means, responsive to open control and closed control signals generated from a remote location, for moving said at least one movable contact so that the circuit path is interrupted and established, respectively; and a rotatable gear which responds to said gear driving means and is coupled to said at least one movable contact so that the circuit path is interrupted in response to said control signal.

According to another embodiment of the present invention, a remote control circuit breaker arrangement has a stationary contact, a movable contact mounted to a carrier and a motor with a shaft connected to its rotor. The motor is activated by a signal from a control module. The motor shaft protrudes from the motor casing and is fixedly connected to a gear spring, causing the gear spring to rotate simultaneously with the motor rotor. A gear having a plurality of teeth positioned between the coils of the gear spring is moved back and forth as the gear spring rotates clockwise or counterclockwise. An operating rod transfers the movement of the gear to move the carrier towards the motor and open the contacts. The invention is preferably used with an overcenter spring mechanism, but may be used with a variety of operating mechanisms, so long as the operating rod moves the carrier partially open in the direction of the blade tripped position. This allows the circuit breaker to trip even when in the open position.

The motor operates to rotate the gear spring clockwise or counterclockwise for a determined time interval in response to a signal from a control module. When the gear spring rotates counterclockwise with respect to the motor, the gear rotates towards the carrier and the movable contact is moved to the closed position. Clockwise rotation of the gear spring with respect to the motor leads the gear away from the carrier to open the contacts. To prevent lock up of the energy management mechanism, a torsional spring may be located beneath the gear to load the gear as it moves counterclockwise, allowing the contacts to close. If the gear is overdriven, the torsional spring will load to rotate the gear clockwise back to engage the gear spring.

An optical or magnetic isolator is coupled to the load side of the circuit breaker to monitor the load and determine whether power to the load has been interrupted. The isolator provides the load power information to the control module.

A contact status indicator is connected to the operating rod. The indicator moves forward when the contacts close, to indicate that the contacts are in a closed position through a hole in the housing of the circuit breaker.

BRIEF DESCRIPTION OF THE DRAWINGS

Other objects and advantages of the invention will be apparent from the following detailed description and the accompanying drawings in which.

Figure 1:
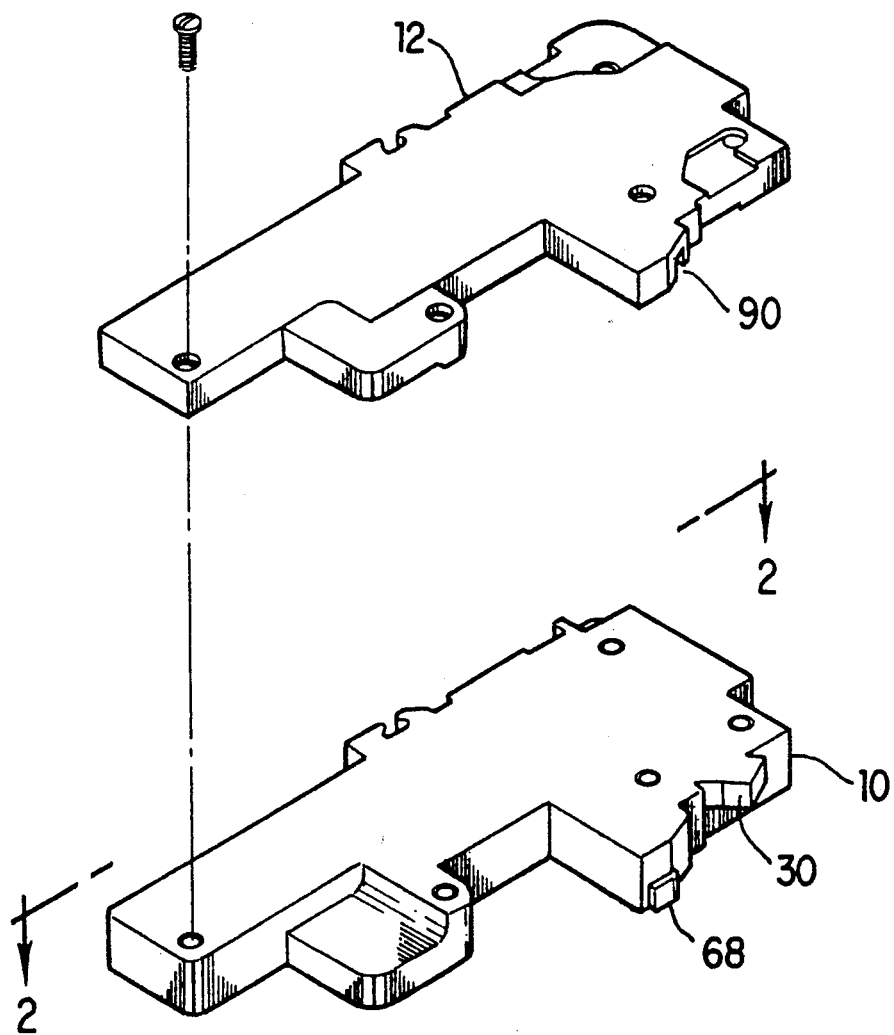
FIG. 1 is a perspective view of a circuit breaker, according to the present invention, illustrating a circuit breaker housing and cover.
Figure 2:
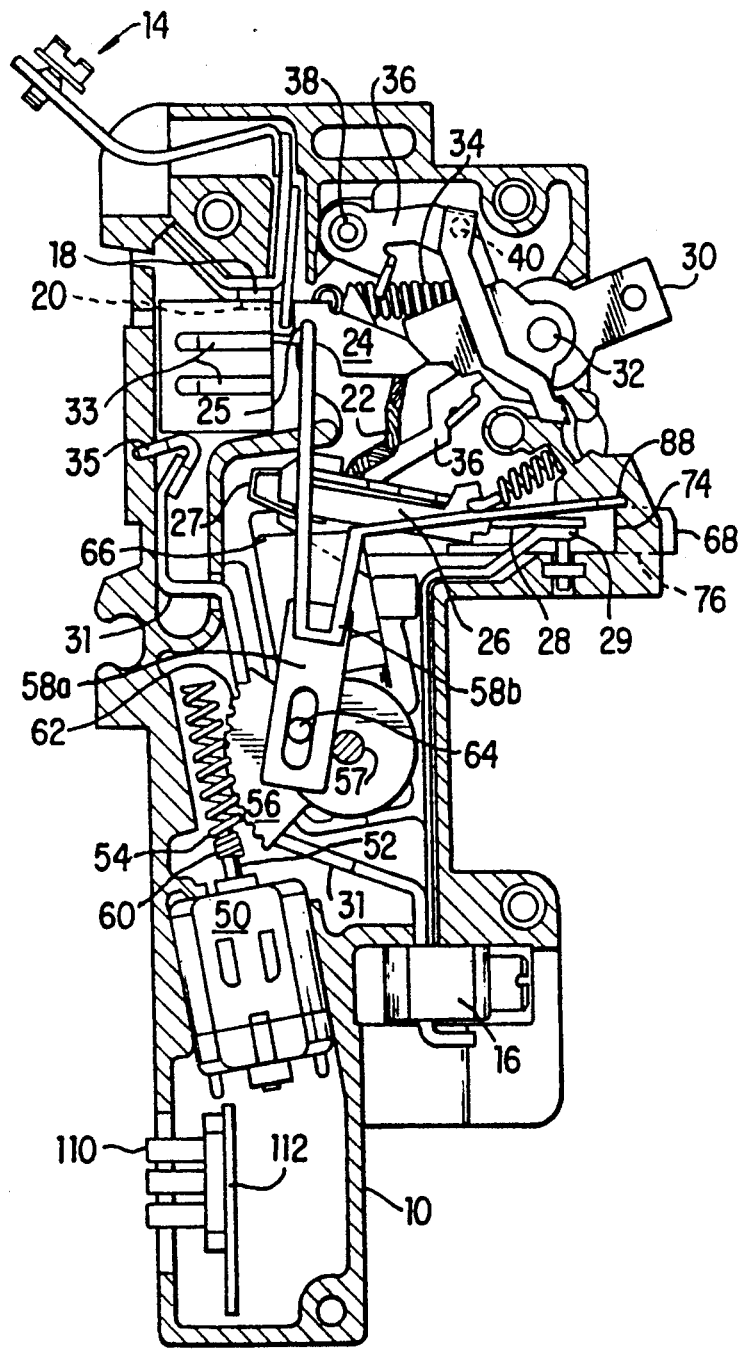
FIG. 2 is a side view of the circuit breaker with the cover removed, showing the circuit breaker in the closed position.
Figure 3A:
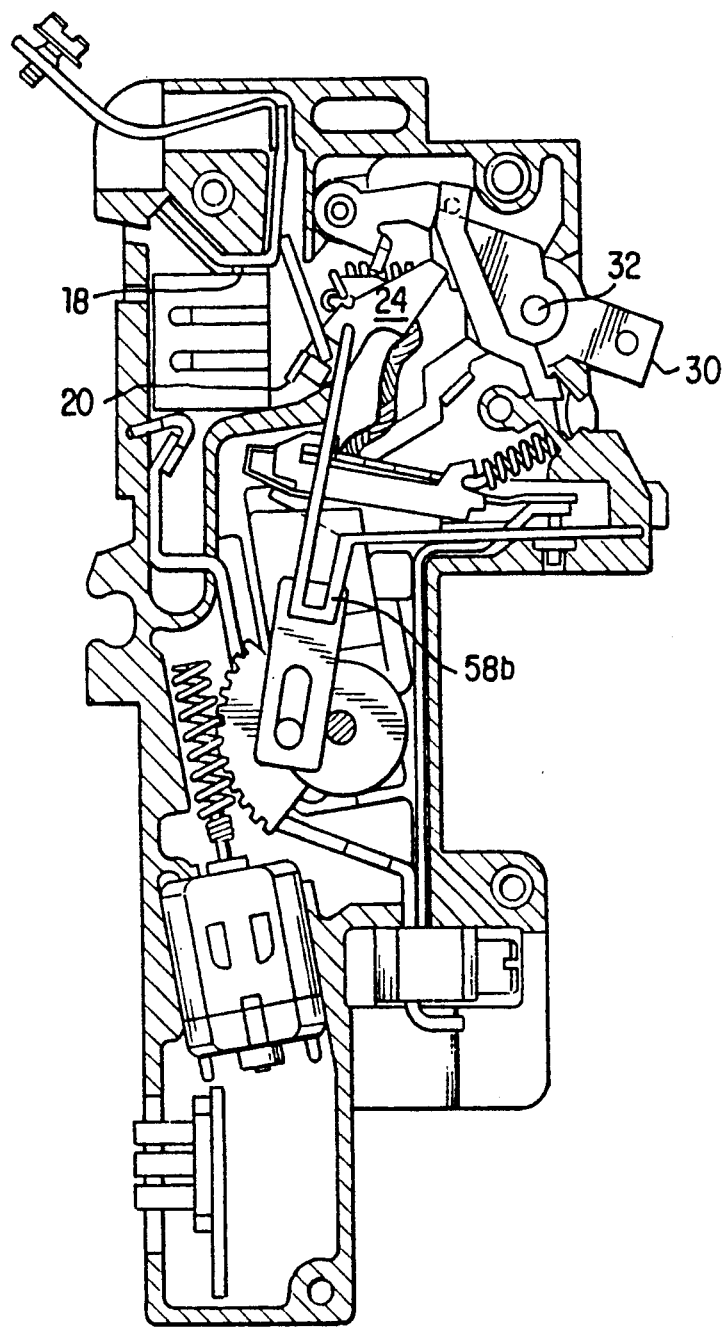
FIG. 3a is another side view of the circuit breaker of FIG. 1 with the cover removed, showing the circuit breaker in the open position.
Figure 3B:
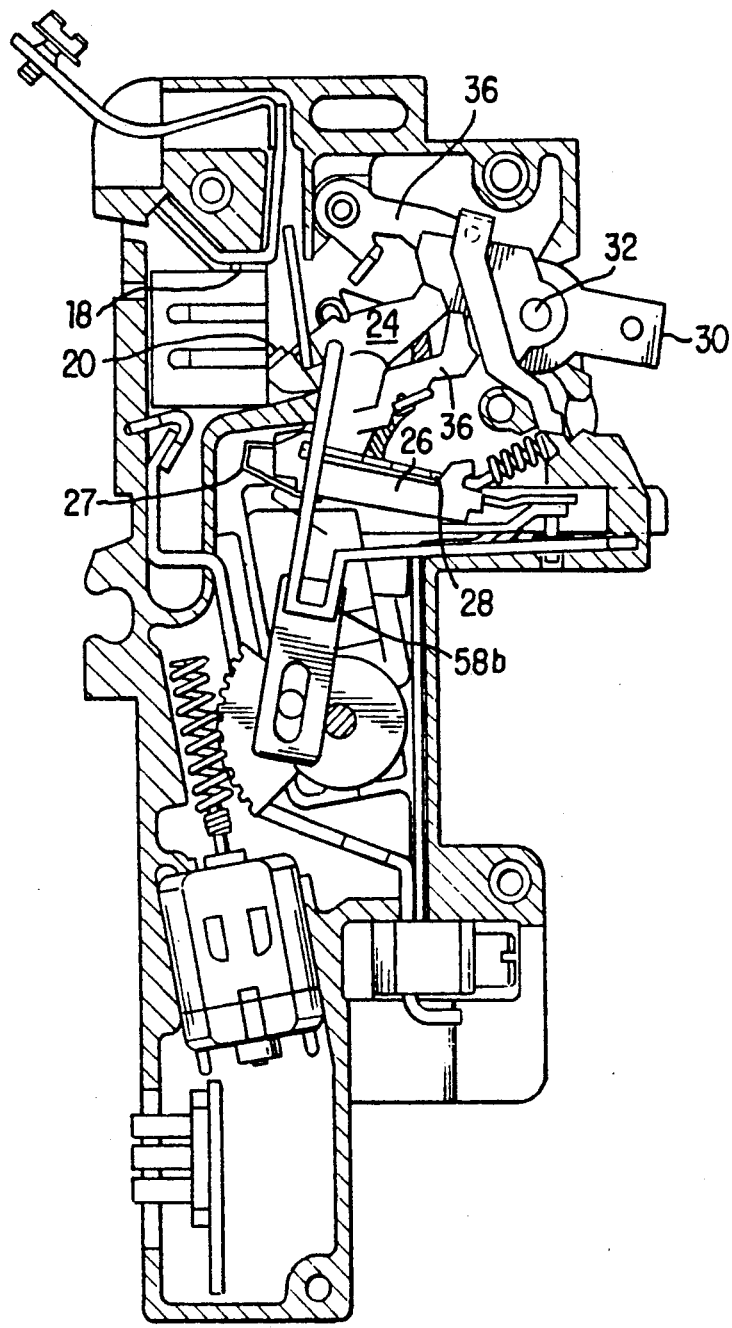
FIG. 3b is another side view of the circuit breaker of FIG. 1 with the cover removed, showing the circuit breaker in the tripped position.

While the invention is susceptible to various modifications and alternative forms, a specific embodiment thereof has been shown by way of example in the drawings and will be described in detail. It should be understood, however, that it is not intended to limit the invention to the particular form described, but, on the contrary, the invention is to cover all modifications, equivalents, and alternatives falling within the spirit and scope of the invention as defined by the appended claims.

DESCRIPTION OF THE PREFERRED EMBODIMENT

Turning now to the drawings and referring specifically to FIGS. 1-4, a preferred embodiment of the present invention is illustrated in the form of a remotely controllable circuit breaker arrangement. The arrangement includes an insulative body or housing 10 closed at one face by a detachable cover 12, a line terminal 14 and a load terminal 16 for completing the circuit between the source and load (not shown). More specifically, the circuit path beginning at line terminal 14 carries current through stationary and movable contacts 18 and 20 and through a flexible copper conductor 22, which is soldered between a carrier 24 and a bimetal 28. The movable contact 20 may be formed as part of the carrier 24. A rigid conductive plate 29, which is welded to the bimetal 28, carries current from the bimetal 28 to the load terminal 16.

The above-described current path is controlled remotely and locally by a number of different components, some of which are similar in structure and operation to the corresponding components in Square D Model No. QO-PL, and in U.S. Pat. No. 4,623,859, entitled REMOTE CONTROL CIRCUIT BREAKER, issued on Nov. 18, 1986, and assigned to the instant assignee. For example, the components associated with an external operating handle 30 and a trip mechanism assembly, whose descriptions immediately follow, are similar in structure and operation to the corresponding components in the above-referenced product and patent.

Local control of the circuit breaker arrangement is provided using the external operating handle 30 pivotally mounted about an axis 32 in the housing 10 to control the contact carrier 24. The upper end of the contact carrier 24 is rotatably secured to the bottom of the operating handle 30 so that the contact carrier 24 can be rocked clockwise and counterclockwise using a biasing spring 34. The biasing spring 34 is secured to the bottom of the carrier 24 and to an equilibrium position on a trip lever 36 so as to urge the carrier 24 toward the handle 30.

In response to movement of the handle 30 to the right or left, the carrier 24 is moved counterclockwise or clockwise, respectively, by the action of the spring 34. The handle 30 moves the top of the carrier 24 to either side of the equilibrium position, so that the bottom of the carrier 24 biases the movable contact 20 to either the open or closed position.

As described in the above-identified patent, the trip mechanism assembly includes an armature 27, a bimetal member 28 and a yoke 26. Upon the occurrence of a moderately sustained overload, from the contact-closed position (FIG. 2), the bimetal member 28 heats up and flexes to the right, causing the armature 27 and the yoke 26 to swing counterclockwise (FIG. 3b) so as to release the stand-off pressure of the end of the trip lever 36, which is pivotable about a pin 38. This causes the trip lever 36 to swing clockwise and the spring 34 to pull the carrier 24 away from the stationary contact 18 so as to interrupt the current path.

Similarly, upon the occurrence of an extensive current overload, the yoke 26 manifests a magnetic force that attracts the armature 27, causing it to swing counterclockwise. This causes the trip lever 36 to swing clockwise and the spring 34 to pull the carrier 24 so that the current path is interrupted.

After being tripped, the trip mechanism assembly is reset by cocking the operating handle 30 to the right so that the bottom of the operating handle 30 pushes pin 40. This engagement of the pin 40 rotates the trip lever 36 in a counterclockwise direction to allow the end of the trip lever 36 to engage and set the armature 27.

Another important part of the present invention concerns the practice of controlling the circuit breaker remotely. Remote control is provided using a motor 50 having a shaft 52 which rotates in one direction to pull the carrier 24 and break the current path and which rotates in the opposite direction to allow the carrier 24 to be pulled by spring 34 to re-establish the current path. This is accomplished with a shaft spring 54 which is mounted around the shaft 52, and a gear 56 which rotates about a pin 57 to control a hook-shaped drive rod assembly which includes an end which bends into a hole 25 in the contact carrier 24 for pulling the carrier 24. The shaft spring 54 is secured at one end 60 to the shaft 52, using a torsional-type pressure fitting, so that the shaft spring 54 rotates with the motor shaft 52. The gear 56 includes teeth 62 which interlock with the windings of the spring 54 to establish a linear relationship between the rotation of the shaft 52 and the rotation of the gear 56 about pin 57. For example, clockwise rotation of the shaft 52 may correspond to a counterclockwise rotation of the gear 56 about pin 57.

A coupling pin 64, which is secured to and protrudes out of the gear 56, responds to the rotation of the gear 56 to control the position of the contact carrier 24. As the gear teeth 62 move with the shaft spring 54, the side of the gear 56 opposite the teeth 62 rotates to the same degree, thereby forcing the coupling pin 64 to rotate about pin 57. The movement of the coupling pin 64 in the counterclockwise direction pulls the drive rod assembly 58a, b to the right in order to pull the contact carrier 24 away from the stationary contact 18. The drive rod assembly 58a, b is sufficiently long to provide a gap on the right side of the coupling pin 64 when the gear 56 is fully rotated clockwise so that the contact carrier 24 does not prevent the contacts 18 and 20 from closing.

In response to the motor operating in the opposite direction, the coupling pin 64 rotates in the clockwise direction and allows the biasing spring 34 to return the contact carrier 24 to the contacts-closed position.

Figure 4:
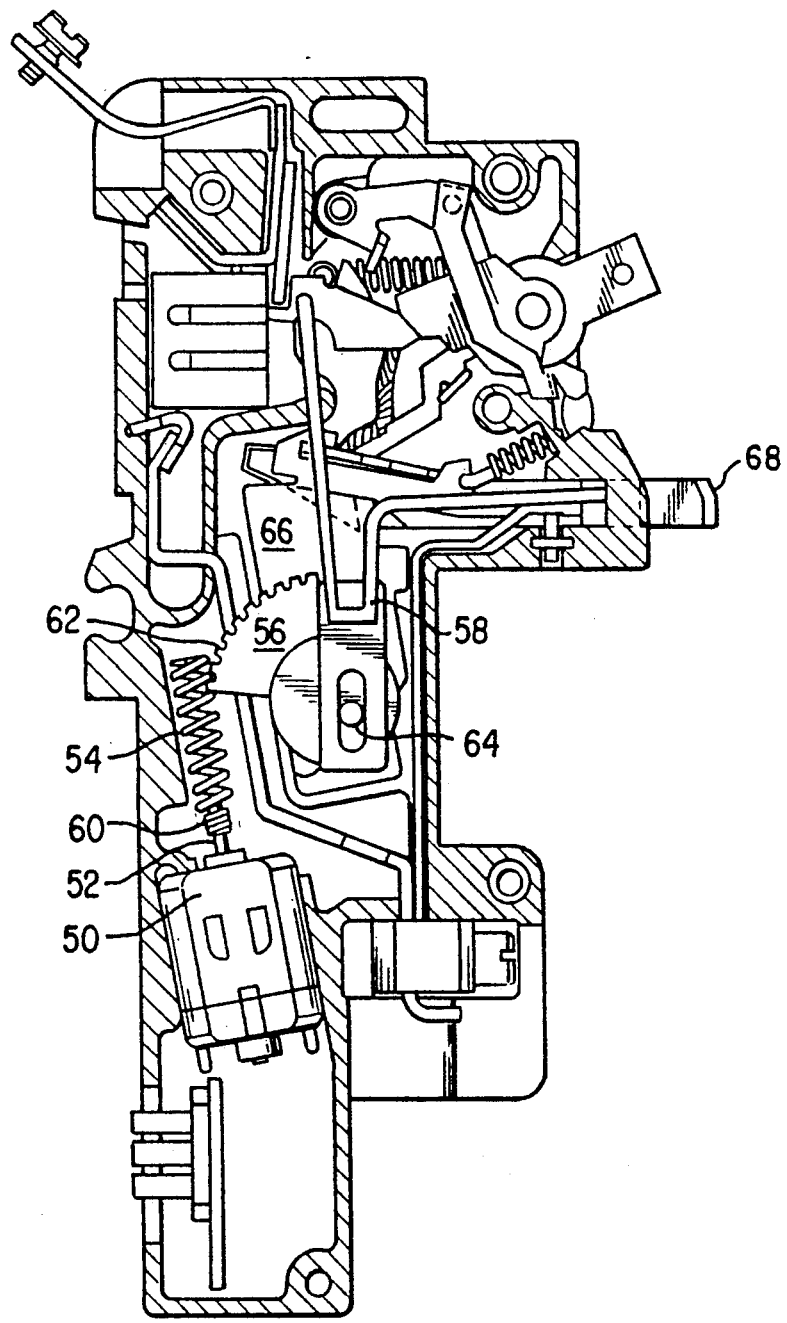
FIG. 4 is yet another side view of the circuit breaker with the cover removed, showing the circuit breaker having a remote control mechanism in the disabled position.
Figure 5:
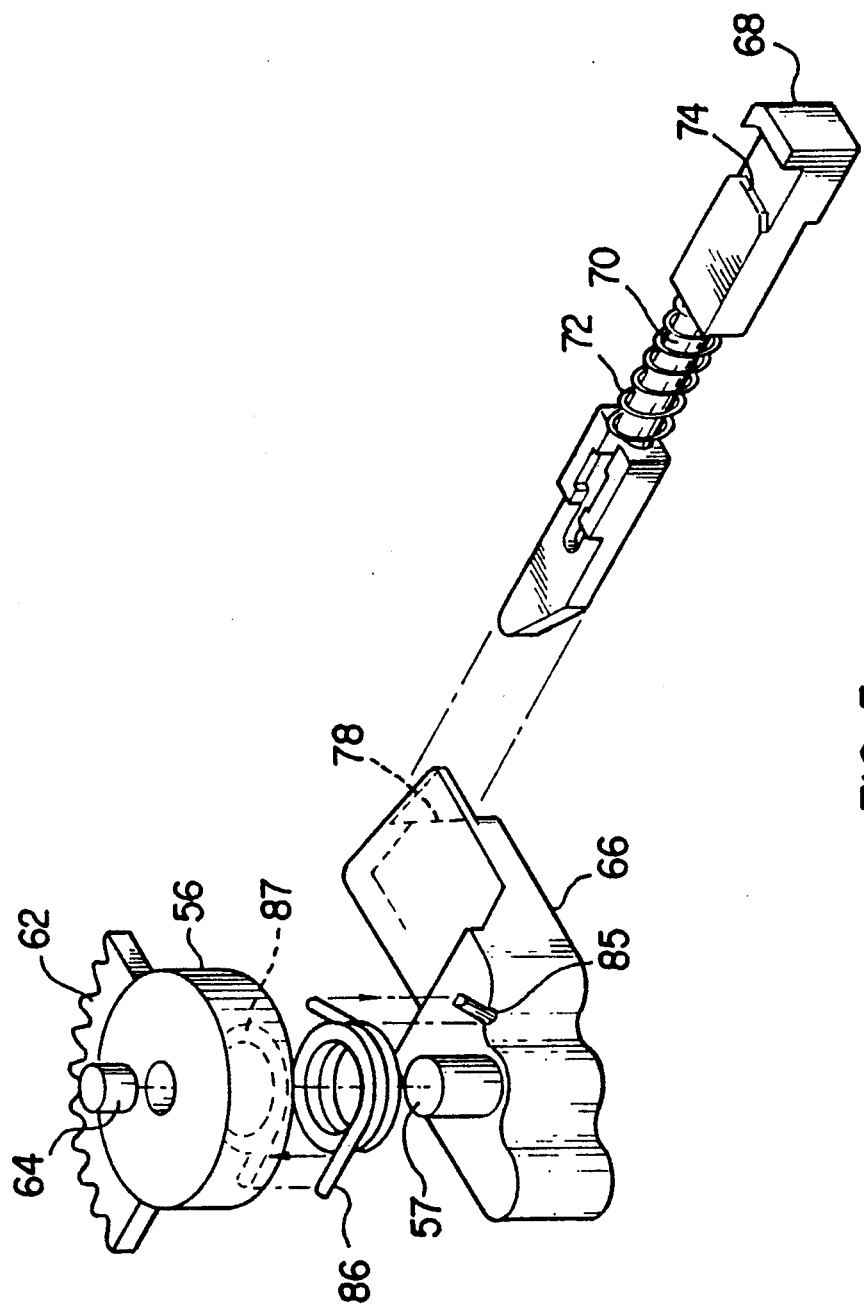
FIG. 5 is a perspective view of a portion of an overdrive mechanism of the circuit breaker of FIG. 1 which is used t disable the remote control mechanism.

The pin 57, about which the gear 56 rotates, is an integral part of a slide mechanism 66 (FIG. 5) and may be used to disable the remote control mechanics of the circuit breaker. The remote control mechanics are disabled, as illustrated in FIGS. 4-5, by pressing a manually operated button 68 laterally to release a holding force from the slide mechanism 66. The holding force is implemented with a spring 72, supported by and surrounding an elongated member 70, urging a shoulder 74 of the elongated member 70 against the inside surface of the housing in aperture 76. When the compression on the spring 72 is released, an angled edge 78 in the slide mechanism 66 forces the elongated member 70 toward the aperture 76 so that the slide mechanism 66 no longer has a fixed position from which the pin 64 can pull the contact carrier 24. Consequently, the slide mechanism 66, rather than the contact carrier 24, moves in response to the rotation of the shaft spring 54.

The slide mechanism 66 is also designed to prevent lockup of the gear 56 on the shaft spring 54 when the remote control mechanics of the circuit breaker are not disabled and are being controlled by the motor 50. Because the shaft spring 54 can drive the gear 56 to either end of its teeth, it is conceivable that the motor 50 can overdrive the gear 56 to the extent that the shaft spring 54 is unable to retain control over the position of the gear 56. As illustrated in FIG. 5, to prevent this potential lock-up situation, a torsion spring 86 may be situated in a slot 85 on the slide mechanism 66 and in a slot 87 in the gear 56 to spring-load the gear 56 in the clockwise or counterclockwise direction. The torsion spring 86 thereby prevents gear overdrive when the gear rotates in the either direction, i.e., to allow the contacts to close or to force the contacts open.

In a preferred embodiment, the torsion spring 86 biases the gear 56 clockwise when the gear is overdriven during counterclockwise rotation, so that the teeth 62 retain engagement with the shaft spring 54. If the gear 56 is overdriven after its clockwise rotation, the biasing spring 34 biases the gear 56 counterclockwise, by pulling the coupling pin 64 via the contact carrier 24 and the coupling member 58, so that the teeth 62 retain engagement with the shaft spring 54.

Referring once again to FIGS. 2 and 3, the present invention also provides a reliable, and conveniently implemented, fail-safe contact status indication for local (versus remote) supervision. Because the hook-shaped coupling member 58 is shaped into an aperture 25 in the contact carrier 24, movement of the moveable contact 20 can be reliably detected by observing movement of the hook-shaped coupling member 58. Thus, a portion 88 of the hook-shaped coupling member 58 is shaped to be observed through an aperture (or window) 90 in the cover 12 (FIG. 1) of the housing. Preferably, a white cap (not shown) is used on the end of the portion 88 so that, when observed through the aperture 90, the white cap indicates that the contacts 18 and 20 are together. Conversely, when the white cap cannot be observed, the contact carrier 24 has moved the white cap to its hidden position on the motor side of the aperture 90. In either case, an observer can easily determine whether the contacts 18 and 20 are closed by looking at the front of the circuit breaker. Because the hook-shaped coupling member 58 is secured to both the contact carrier 24 and the gear 56 with no intervening, breakable parts, observing the portion 88 reliably indicates the position of the contact carrier 24.

Another aspect of the circuit breaker arrangement shown in FIGS. 1-4 concerns the manner in which energy is shunted around the bimetal member 28 during short circuit conditions. Extending down from the load lug 16 to arc plates 33 is a shunt terminal 31 (similar to the load terminal 29), which dissipates arcing current during the short circuit conditions. An arc yoke 35 is used to attract the arc and shunt current around the bimetal member 28. Since this type of arc shunting practice is conventional in expanding the short circuit capacity (otherwise limited by the current capacity of the bimetal member 28), e.g., as in Square D Circuit Breaker Model QOE, and is not an important part of the present invention, it will not be discussed in further detail.

Most of the nonconductive components, e.g., the housing 10, the cover 12 and the operating handle 30, may be made from a thermoset-type plastic. The hook-shaped coupling member 58b and the springs may be manufactured using any durable metal.

Electrically, the preferred circuit breaker arrangement is operated using signals which pass through a plug-in connector 110 and a circuit board assembly 112. The plug-in connector 110 provides a conveniently removable interconnection between the circuit breaker and a remotely located control/monitoring device, while the circuit board assembly 112 carries the interface circuit for controlling the motor 50 and monitoring the current delivered to the load through load terminal 16.

Figure 6:
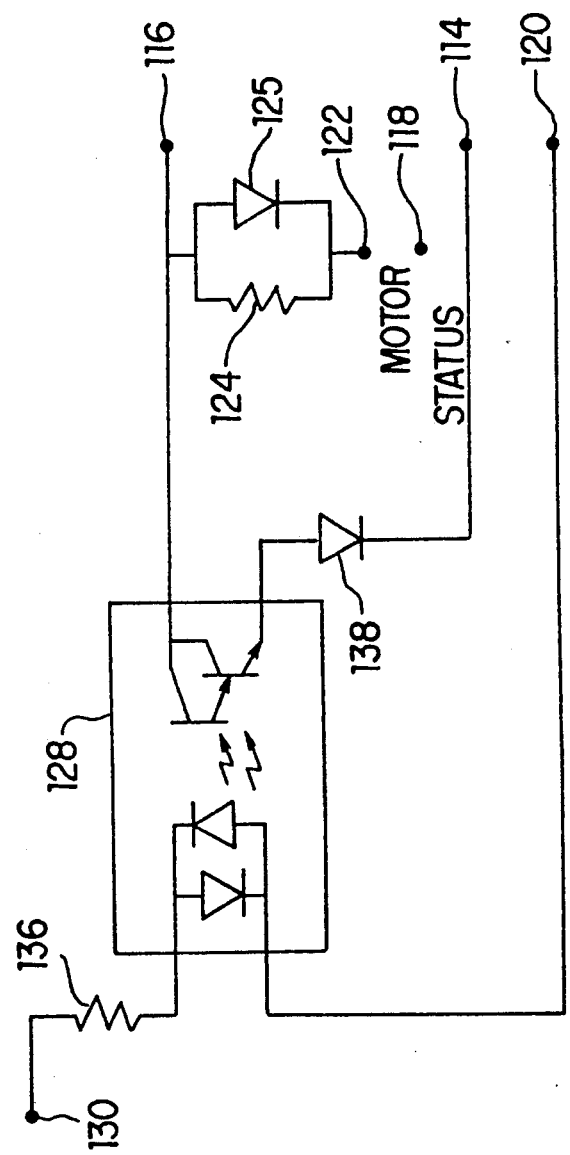
FIG. 6 is a schematic diagram including an electrical circuit which may be used to control the circuit breaker motor depicted in the previous figures and to monitor and report the status of the contacts.

FIG. 6 depicts a schematic diagram of the circuit on the circuit board assembly 112. There are four leads carried by the plug-in connector 110; they include: a status lead 114, positive and negative motor leads 116 and 118, and a neutral lead 120, which is common to the circuit breaker and the device providing the remote control signalling.

The motor 50, which is preferably implemented using a FK130S-10300 Mabuchi DC motor, is directly connected to the circuit board assembly 112 at lead 118 and lead 122, with lead 116 connected to the motor 50 indirectly through a parallel resistor/diode arrangement 124/125. The parallel resistor/diode arrangement 124/125 serves two functions. The diode 125 may be used to provide current flow in a unilateral direction, while the resistor 124 is used to control the power provided from lead 116 to the motor 50.

The value of the resistor 124 is selected according to the necessary current specified to operate the motor. In the event that the lead 116 is used to control a motor, e.g., for controlling two or three circuit breaker poles, the resistance required will vary. For single pole operation by the FK130S-10300 Mabuchi motor exemplified above, the value of the resistor 124 is preferably 12 Ohms.

Forward and reverse rotation of the motor shaft 52 is then provided by applying the appropriate voltage to either lead 116 or lead 118. Provision of +24 Volts over lead 116, with respect to ground, will rotate the motor shaft 52 to cause the contact carrier 24 to separate the contacts 18 and 20, and provision of −24 Volts over lead 118, with respect to ground, will rotate the motor shaft 52 in the opposite direction to allow the contacts 18 and 20 to reconnect in the previously discussed manner.

The current that is provided to the load is remotely monitored using a sensor which is optically or magnetically coupled to the load side of the circuit breaker and communicatively coupled to the remote control/monitoring station via status lead 114 and the plug-in connector 110. The status lead 114 may be directly connected (or coupled via a radio or other nonwire interface) to the remote control signalling device to report whether or not the current path to the load has been interrupted. This is accomplished in the illustrated embodiment using a line isolation circuit, e.g., opto-isolator 128 (FIG. 6), having an input connected to the load terminal 16 (also shown in FIG. 2 where lead 130 is connected to the shunt terminal 31) and having an output, lead 114, connected directly to the remote control signalling device. While current is being provided to the load, current passes through current limiting resistor 136 to activate the opto-isolator 128. When activated, the opto-isolator 128 passes current through its collector-emitter output ports so as to report to the remote control/monitoring device via leads 116 and 114. When current to the load is interrupted, voltage at lead 130 is absent and the output ports of the opto-isolator 128 do not pass current; thereby indicating to the remote control/monitoring device that the contacts have interrupted the current path provided to the load. The resistor 136, preferably 180k Ohms at a ⅛ Watt rating, may be used at the input of the opto-isolator 128 to offset the heat dissipating through the opto-isolator 128.

A diode 138 may be used to prevent reverse current from causing false contact status readings in other parts of the system, e.g., from another circuit board assembly 112 OR-tied at lead 114. Such a configuration is described in detail in the aforementioned co-pending application which is being filed herewith.

The signal which is transmitted from the remote control/monitoring device to open or close the contacts is preferably a DC pulse having a prescribed width. This pulse width is selected in accordance with a calculated and premeasured test signal to rotate the gear 56 over a predetermined angle and, thus, move the contact carrier 24 linearly over a predetermined length so that the contacts 18 and 20 are separated or closed.

The remote control/monitoring device may then check lead 114 to determine if the circuit breaker properly responded to the transmitted contacts-open (contacts-closed) command. If the lead 114 indicates that the contacts-open (contacts-closed) command was not obeyed properly, the remote control/monitoring device may then transmit one or more additional pulses in an attempt to move the contact carrier 24 slightly further. Preferably, the remote control/monitoring device transmits up to three additional pulses, one at a time, until the lead 114 indicates that the contact carrier 24 has reacted as instructed. Preferably, the original pulse width is about 47 milliseconds to open the contacts and about 14 milliseconds to close the contacts. The pulse width of each of the follow-up pulses is equivalent to the original pulse width.

The foregoing description is not limited to the specific embodiment herein described, but rather by the scope of the claims which are appended hereto. For example, although the invention has been described with reference to a single pole circuit breaker, the design may be easily adapted to a multipole circuit breaker to be operated from a remote location. Moreover, in certain applications, it is conceivable that the motor/gear assembly may be replaced by a solenoid operated mechanism.

What is claimed is:

1. A remotely controllable circuit breaker device for interrupting power in a circuit path between a source and a load, comprising:
   a first contact and a second contact cooperatively arranged in the circuit path, and within a housing, so as to provide current from the source to the load and at least one of the contacts being movable for interrupting the power provided to the load;
   gear driving means, responsive to open control and closed control signals generated from a remote location, for moving said at least one movable contact so that the circuit path is interrupted and established, respectively;
   a rotatable gear which connects to and responds to said gear driving means, said rotatable gear being mounted to said device on a pivot and being integrally formed with a coupling pin which is coupled to said at least one movable contact so that the circuit path is interrupted in response to said control signal; and
   a one-piece coupling arm secured at one end to said at least one movable contact, another end of said coupling arm being integrally formed with a lost motion cam, said cam having an elongated slot formed therein to engage said coupling pin and provide a gap between said coupling pin and the coupling arm when the contacts are closed, whereby the contacts are not prevented from closing even when the contacts are worn.

2. A circuit breaker device as claimed in claim 1 wherein the gear driving means includes a motor having a rotatable shaft secured to a spring having windings, the rotatable gear being positioned between the windings of the spring as the shaft rotates.

3. A circuit breaker device as claimed in claim 2 wherein the motor operates in a first direction, in response to a first signal, to move the movable contact to an open position, and operates in a second direction, in response to a second signal, to move the movable contact to a closed position.

4. A circuit breaker device as claimed in claim 1 wherein the gear driving means includes a worm-gear mechanism.

5. A circuit breaker device as claimed in claim 4 wherein the worm-gear mechanism includes a motor which is electrically connected to a printed circuit board, said printed circuit board having means for providing current flow in a unilateral direction and reversibly controlling the power provided to the motor and wherein the printed circuit board is electrically connected to receive the open control and closed control signals through a plug-in control socket.

6. A circuit breaker device as claimed in claim 1 further including a trip mechanism for moving the movable contact to an open position in response to the presence of an overload condition, ad wherein the trip mechanism operates independently of the motor.

7. A remotely controllable circuit breaker device for interrupting power in a circuit path between a source and a load, comprising:
   a housing;
   a first contact and a second contact cooperatively arranged in the circuit path, and within the housing, so as to provide current from the source to the load and at least one of the contacts being secured to a contact carrier which is moved to interrupt the power provided to the load;

movement means, responsive to open and close control signals generated from a remote location, for moving the contact carrier so that the circuit path is interrupted and established, respectively;

window means for indicating the contact status of the circuit breaker device within the housing; and a one-piece, integrally formed coupling member having three ends, responsive to said movement means, the first end thereof being secured to the contact carrier, the second end thereof being integrally formed with a lost motion cam, the cam having an elongated slot formed therein to engage said movement means and provide a gap between the coupling member and the movement means when the contacts are closed, and the third end thereof being visible by an observer via the window means;

wherein, in response to the open and close control signals, the third end of the coupling member indicates, via the window means, whether the circuit path is interrupted or established, respectively.

8. A remotely and locally controllable and monitorable circuit breaker device for interrupting power in a circuit path between a source and a load, comprising:

a housing having window means for indicating the contact status of the circuit breaker device;

a first contact and a second contact cooperatively arranged in the circuit path, and within said housing, so as to provide current from the source to the load and at least one of the contacts being secured to a contact carrier which is moved to interrupt the power provided to the load;

movement means, responsive to open and close control signals generated from a remote location, for moving the contact carrier so that the circuit path is interrupted and established, respectively;

sensing means, coupled to the load, for determining when the circuit path is interrupted and when it is established and having an output port that is line-isolated from the source, for monitoring the load to determine whether or not power to the load has been interrupted, said sensing means having an output port through which a status signal is sent to a remote location to indicate whether or not power to the load has been interrupted; and a one-piece, integrally formed coupling member having three ends, responsive to said movement means, the first end thereof being secured to the contact carrier, the second end thereof being integrally formed with a lost motion cam, the cam having an elongated slot formed therein to engage said movement means and provide a gap between the coupling member and the movement means when the contacts are closed, and the third end thereof being visible by an observer via the window means;

wherein, in response to the open and close control signals, the third end of the coupling member, via the window means, and the sensing means, via the output port, simultaneously indicate whether or not the circuit path is interrupted.

9. A circuit breaker device as claimed in claim 8 wherein the sensing means includes an opto-isolator.

10. A circuit breaker device as claimed in claim 8 wherein the sensing means is mounted on a printed circuit board which is located within the circuit breaker housing.

11. A circuit breaker device as claimed in claim 8 wherein the sensing means includes an opto-isolator mounted on a printed circuit board which is located within the circuit breaker housing, and wherein the opto-isolator is electrically connected to the load to determine whether power to the load has been interrupted.

12. A circuit breaker comprising:

a first contact;

a movable contact being movable between at least an open position and a closed position, wherein in the open position the movable contact is spaced away from the first contact, and in the closed position the movable contact is in contact with the first contact;

gear control means for moving the movable contact between the open position and the closed position;

a gear, comprising a plurality of teeth, which rotates about a pivot point in response to the gear control means, said gear having a coupling pin mounted thereon;

a one-piece coupling arm secured at one end to said movable contact, another end of said coupling arm being integrally formed with a lost motion cam, said cam having an elongated slot formed therein to engage said coupling pin and provide a gap between said coupling arm and said coupling pin when the contacts are closed, whereby the contacts are not prevented from closing even when the contacts are worn;

an overdrive element including a torsional spring, positioned beneath said gear, to bias the gear so that control of the plurality of teeth is maintained by the gear control means when the gear is fully rotated by the gear control means.

13. A circuit breaker device comprising:

a first contact;

a movable contact being movable by a first spring between at least an open position and a closed position, wherein in the open position the movable contact is spaced from the first contact, and in the closed position the movable contact is in contact with the first contact;

a motor having a shaft operating in a first direction in response to a first signal from a remote location; p1 a second spring, which is mounted on the shaft, the second spring having windings rotatable under control of the motor;

a gear comprising a plurality of teeth which are positioned between the windings of the spring as it rotates;

an operating rod coupled between said gear and the movable contact for moving the movable contact to one of the closed and open positions in response to the motor; and an overdrive element including a third spring, positioned beneath said gear, to bias the gear so that control of the plurality of teeth is maintained by the second spring when the gear is fully rotated in a counterclockwise rotation.

14. A circuit breaker device, according to claim 13, wherein the first spring biases the gear so that control of the plurality of teeth is maintained by the second spring when the gear is fully rotated in a clockwise rotation.

15. A remotely controllable circuit breaker device for interrupting power in a circuit path between a source and a load, comprising:

a housing;

a first contact and a second contact cooperatively arranged in the circuit path within said housing so as to provide current from the source to the load and at least one of the contacts being movable for interrupting the power provided to the load;

a motor having a rotatable shaft which responds to open and closed control signals generated from a remote location;

gear driving means, rotatably responsive to the rotatable shaft, for removing said at least one movable contact so that the circuit path is interrupted and established, respectively;

a rotatable gear which connects to and responds to said gear driving means, said rotatable gear being mounted to a slide mechanism on a pivot and being integrally formed with a coupling pin;

a one-piece coupling arm secured at one end to said at least one movable contact, another end of said coupling arm being integrally formed with a lost motion cam, said cam having an elongated slot formed therein to engage said coupling pin and provide a gap between said coupling arm and said coupling pin when the contacts are closed, whereby the contacts are not prevented from closing even when the contacts are worn; and a manually operated disengaging member, one end of said member having an angled edge which extends through said housing to abut said slide mechanism preventing movement of the slide mechanism, said member having an indentation forming a shoulder which frictional engages a corresponding shoulder in the housing to hold the member in an abutting predetermined position with said slide mechanism, said member being released from this position by laterally moving the shoulders apart, whereby the angled edge moves from the abutting position and no longer holds the slide mechanism and, consequently, said rotatable gear and coupling pin in a fixed position which allows said slide mechanism rather than said at least one movable contact to move in response to the rotatable shaft and renders the coupling arm non-responsive to the gear driving means.

16. A circuit breaker device as claimed in claim 15 wherein the manually operated disengaging member is spring activated.

* * * * *